United States Patent
Oh et al.

(10) Patent No.: US 10,910,665 B2
(45) Date of Patent: *Feb. 2, 2021

(54) LITHIUM SECONDARY BATTERY AND MANUFACTURING METHOD THEREOF

(71) Applicants: HYUNDAI MOTOR COMPANY, Seoul (KR); KIA MOTORS CORPORATION, Seoul (KR); Incheon University Industry Academic Cooperation Foundation, Incheon (KR)

(72) Inventors: Seung-Min Oh, Incheon (KR); Yeolmae Yeo, Anseong-si (KR); Kiseok Koh, Suwon-si (KR); Yoon Sung Lee, Suwon-si (KR); Tae-Hyun Kim, Incheon (KR); Junyoung Mun, Incheon (KR); Nakgyu Go, Incheon (KR)

(73) Assignees: Hyundai Motor Company, Seoul (KR); Kia Motors Corporation, Incheon (KR); Incheon University Industry Academic Cooperation Foundation, Incheon (KR)

( * ) Notice: Subject to any disclaimer, the term of this patent is extended or adjusted under 35 U.S.C. 154(b) by 138 days.

This patent is subject to a terminal disclaimer.

(21) Appl. No.: 16/032,485

(22) Filed: Jul. 11, 2018

(65) Prior Publication Data

US 2019/0305358 A1    Oct. 3, 2019

(30) Foreign Application Priority Data

Mar. 29, 2018    (KR) .................... 10-2018-0036387

(51) Int. Cl.
*H01M 2/34* (2006.01)
*H01M 2/10* (2006.01)
(Continued)

(52) U.S. Cl.
CPC ......... *H01M 10/052* (2013.01); *H01M 2/162* (2013.01); *H01M 4/0404* (2013.01);
(Continued)

(58) Field of Classification Search
CPC combination set(s) only.
See application file for complete search history.

(56) References Cited

U.S. PATENT DOCUMENTS 10,734,651 B2 *   8/2020  Oh .................. H01M 4/386
2012/0088155 A1 * 4/2012  Yushin .............. H01M 2/16
                                               429/217

(Continued)

FOREIGN PATENT DOCUMENTS

JP    2010-212144 A    9/2010
KR    10-1753943 B1    7/2017

OTHER PUBLICATIONS

Extended European Search Report dated Mar. 5, 2019 issued in European Patent Application No. 18182878.1.

*Primary Examiner* — Ula C Ruddock
*Assistant Examiner* — Sarika Gupta
(74) *Attorney, Agent, or Firm* — Morgan, Lewis & Bockius LLP

(57) ABSTRACT

Disclosed herein are provided a lithium secondary battery capable of improving an output characteristic, a life characteristic, and stability of electrode adhesion by using a binder containing dopamine-polymerized heparin in a anode containing silicon. In accordance with an aspect of the present disclosure, a lithium secondary battery includes: an cathode; a anode; a separation film disposed between the cathode and the anode; and an electrolyte, wherein the anode comprises an electrode active material comprising a silicon-based material and graphite, a binder and a conductive (Continued)

material, and the binder comprises any one of heparin and lithium polyacrylate (LiPAA).

6 Claims, 6 Drawing Sheets

(51) Int. Cl.
| | |
|---|---|
| *H01M 2/20* | (2006.01) |
| *H01M 10/42* | (2006.01) |
| *H01M 10/04* | (2006.01) |
| *H01M 2/02* | (2006.01) |
| *H01M 10/052* | (2010.01) |
| *H01M 2/16* | (2006.01) |
| *H01M 4/134* | (2010.01) |
| *H01M 4/1393* | (2010.01) |
| *H01M 4/583* | (2010.01) |
| *H01M 4/62* | (2006.01) |
| *H01M 10/058* | (2010.01) |
| *H01M 4/04* | (2006.01) |
| *H01M 4/02* | (2006.01) |

(52) U.S. Cl.
CPC ......... *H01M 4/134* (2013.01); *H01M 4/1393* (2013.01); *H01M 4/583* (2013.01); *H01M 4/622* (2013.01); *H01M 10/0459* (2013.01); *H01M 10/058* (2013.01); *H01M 2004/027* (2013.01); *H01M 2004/028* (2013.01)

(56) References Cited

U.S. PATENT DOCUMENTS

| | | |
|---|---|---|
| 2012/0100217 A1 | 4/2012 | Green et al. |
| 2014/0065491 A1 | 3/2014 | Yokouchi et al. |
| 2014/0234704 A1* | 8/2014 | Kamizori ............ H01M 10/052 429/200 |
| 2015/0037672 A1 | 2/2015 | Yang et al. |
| 2015/0243997 A1 | 8/2015 | Park et al. |
| 2015/0303456 A1 | 10/2015 | Yoo et al. |
| 2016/0111718 A1 | 4/2016 | Figgemeier et al. |
| 2016/0240858 A1 | 8/2016 | Yamada et al. |
| 2017/0005325 A1 | 1/2017 | Verma et al. |

* cited by examiner

LITHIUM SECONDARY BATTERY AND MANUFACTURING METHOD THEREOF

CROSS-REFERENCE TO RELATED APPLICATION(S)

This application claims priority to and the benefit of Korean Patent Application No. 10-2018-0036387, filed on Mar. 29, 2018 in the Korean Intellectual Property Office, the disclosure of which is incorporated by reference in its entirety.

TECHNICAL FIELD

The present disclosure relates to a lithium secondary battery.

BACKGROUND

In general, a lithium secondary battery comprising an electroactive material has a high operating voltage and high energy density compared to a lead battery or a nickel/cadmium battery. Accordingly, the lithium secondary battery is widely used as energy storage means for an Electric Vehicle (EV) and a Hybrid Electric Vehicle (HEV).

The mileage of EVs can be improved by densifying battery energy. In order to densify battery energy, the energy density of materials used in the battery should be improved. Recently, a lithium secondary battery using a Ni-, Co-, or Mn-based cathode and a graphite anode has been developed.

However, other materials capable of substituting the materials are also being developed in order to overcome the limitations of energy density. Presently, studies on silicon having a large capacity exceeding 4000 mAh/g and high energy density compared to graphite having a capacity of 360 mAh/g are being actively conducted.

SUMMARY

An aspect of the present disclosure provides a lithium secondary battery capable of improving an output characteristic, a life characteristic, and stability of electrode adhesion by using a binder containing heparin or lithium polyacrylate (LiPAA) in a anode containing silicon.

Additional aspects of the disclosure will be set forth in part in the description which follows, and in part, will be obvious from the description, or may be learned by practice of the disclosure.

In accordance with an aspect of the present disclosure, a lithium secondary battery includes: an cathode; a anode; a separation film disposed between the cathode and the anode; and an electrolyte, wherein the anode comprises an electrode active material comprising a silicon-based material and graphite, a binder and a conductive material, and the binder comprises any one of heparin and lithium polyacrylate (LiPAA).

The silicon-based material has a diameter of 50 nm or more and less than 10 μm.

The anode includes the binder in an amount of 1 wt % or more and less than 50 wt %.

The conductive material includes at least one of carbon black and vapor grown carbon fiber (VGCF).

The anode includes the conductive material and the binder in a ratio of 1:1 to 1:10.

The binder further includes dopamine-polymerized heparin.

In accordance with another aspect of the present disclosure, a method of manufacturing a lithium secondary battery includes: performing a first milling using a ball mill device for an electrode active material comprising a silicon-based material and a binder; adding a conductive material to the compound of the electrode active material and the binder obtained through the first milling, and performing a second milling for the compound using the ball mill device; and performing a heat treatment for the compound of the electrode active material, the binder and the conductive material obtained through the second milling.

The performing the first milling includes: putting the electrode active material and the binder into the ball mill device; putting a compound of $ZrO_2$ ball and powder mixed in a ratio of 20:1 (wt %) into the ball mill device; and repeating the process three times which performs the milling for 1 hour at a speed of 500 rpm with a resting time of 30 minutes.

The performing the heat treatment includes: performing the heat treatment in an argon (Ar) atmosphere at 300° C. for 1 hour.

The conductive material includes at least one of carbon black and vapor grown carbon fiber (VGCF).

The binder includes any one of heparin and lithium polyacrylate (LiPAA) and dopamine-polymerized heparin.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Like numbers refer to like elements throughout this specification. This specification does not describe all components of the embodiments, and the general information in the technical field to which the present disclosure belongs or the overlapping information between the embodiments will not be described.

It will be understood that the terms "includes," "comprises," "including," and/or "comprising" when used in this specification, specify the presence of a stated component, but do not preclude the presence or addition of one or more other components.

It is to be understood that the singular forms "a," "an," and "the" include plural referents unless the context clearly dictates otherwise.

Hereinafter, embodiments of the present disclosure will be described in detail with reference to the accompanying drawings and tables. First, a lithium secondary battery will be described, and then a binder according to an embodiment will be described.

Figure 1:
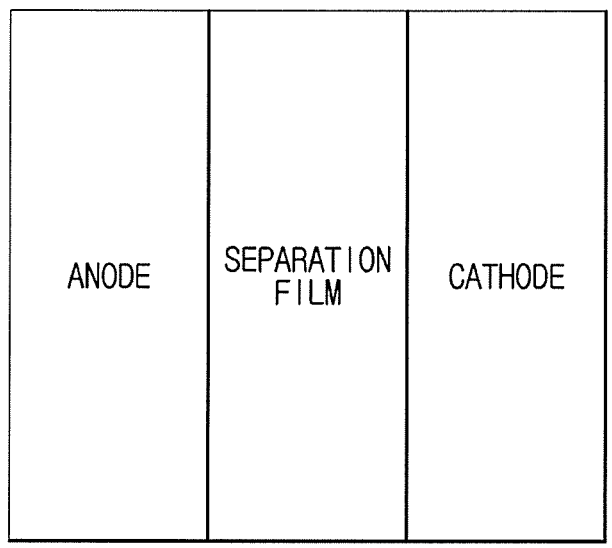
FIG. 1 conceptually shows a lithium secondary battery according to an exemplary embodiment of the present disclosure.

FIG. 1 conceptually shows a lithium secondary battery according to an exemplary embodiment of the present disclosure.

As shown in FIG. 1, generally, a lithium secondary battery includes an cathode, a anode, a separation film, and an electrolyte. The cathode, the anode, and the separation film form an electrode structure, and are components typically used to manufacture the lithium secondary battery.

An electrode may include an electrode active material and a binder according to an embodiment. More specifically, the electrode according to an embodiment may be formed by applying electrode slurry formed by mixing the electrode active material, the binder, a solvent, and a conductive material to a predetermined thickness on an electrode current collector, and then drying and rolling the electrode slurry. The binder may be a binder for the anode, which will be described in detail later.

A anode active material which is used to manufacture the anode may be an arbitrary anode active material that can insert and separate lithium ions. The anode active material may be any one or a combination of two or more selected from among the group consisting of a material capable of reversibly absorbing and separating lithium, a metal material capable of alloying with lithium, and a mixture thereof. The material capable of reversibly absorbing and separating lithium may be at least one material selected from among the group consisting of synthetic graphite, natural graphite, graphitized carbon fiber, graphitized mesocarbon microbeads, fullerene, and amorphous carbon. The amorphous carbon may be hard carbon, coke, MCMB and MPCF fired at 1500° C. or lower, or the like. The metal material capable of alloying with lithium may be at least one metal selected from among the group consisting of Al, Si, Sn, Pb, Zn, Bi, In, Mg, Ga, Cd, Ni, Ti, Mn, and Ge. The metal materials may be used alone, mixed with each other, or alloyed with each other. The metal materials may be used as a compound mixed with a carbon-based material.

The anode active material may be a compound of a graphite-based anode active material and a silicon (Si)-based anode active material. The Si-based anode active material may expand excessively upon charging or discharging to influence adhesion of the binder, resulting in a reduction of the life characteristic, although having high capacity. However, the binder according to an embodiment may solve the problem to provide a lithium ion battery that is excellent in view of an output characteristic, a life characteristic, and stability of electrode adhesion.

The Si-based anode active material includes silicon oxide, silicon particles, silicon alloy particles, and the like. Representative examples of the alloy include a solid solution of aluminium (Al), manganese (Mn), iron (Fe), titanium (Ti), etc. alloyed with a silicon element, an intermetallic compound, an eutectic alloy, etc., although not limited to these.

An cathode active material that is used to manufacture an cathode, according to an embodiment, may include a compound allowing reversible intercalation and deintercalation of lithium. More specifically, the cathode active material may be at least one of composite oxide of lithium and a metal selected from among cobalt, manganese, nickel, and a combination thereof.

The electrode according to an embodiment may further contain other additives, such as a dispersion medium, a conductive material, a viscosity modifier, and a filling material, in addition to the electrode active material and the binder described above.

The separation film may prevent a short circuit between the cathode and the anode, and provide a passage of lithium ions. The separation film may be a polyolefin-based polymer film including polypropylene, polyethylene, polyethylene/polypropylene, polyethylene/polypropylene/polyethylene, and polypropylene/polyethylene/polypropylene or a multi-layer film thereof, a microporous film, fabric, and non-woven fabric, which are well-known in the related art. A microporous polyolefin film coated with a resin having high stability may be used. If the electrolyte is a solid electrolyte such as a polymer, the solid electrolyte may function as the separation film.

The electrolyte may contain lithium salt and a non-aqueous organic solvent, and further contain an additive for improving the charging/discharging characteristics and preventing overcharging. The lithium salt may be, for example, a mixture of one or more materials selected from among the group consisting of $LiPFe$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_6)_2$, $Li(CF_3SO_2)_2N$, $LiC_4F_9SO_3$, $LiB(C_6H_6)_4$, $Li(SO_2F)_2N$ (LiFSI) and $(CF_3SO_2)_2NLi$.

The non-aqueous organic solvent may further contain an aromatic hydrocarbon organic solvent. Examples of the aromatic hydrocarbon organic solvent may be benzene, fluorobenzene, bromobenzene, chlorobenzene, cyclohexylbenzene, isopropyl benzene, n-butylbenzene, octyl benzene, toluene, xylene, mesitylene, etc., which can be used alone or in combination.

Hereinafter, a anode of a lithium secondary battery, according to an embodiment, will be described in detail. In the following description, the unit is weight % (wt %), unless specifically noted.

The silicon-based material used as the electrode active material of the anode according to an embodiment may have a diameter of 50 nm or more and less than 10 um. The anode may contain the binder in an amount of 1 to 50 wt %, and more preferably 5 to 30 wt %. The conductive material and the binder may be contained in the anode at a ratio of 1:1 to 1:10.

The silicon-based material used as the electrode active material is as described above. As the conductive material, carbon black or vapor grown carbon fiber (VGCF) may be used.

Heparin, dopamine-polymerized heparin and LiPAA (Lithium polyacrylate) may be used as the binder according to exemplary embodiments.

The lithium secondary battery according to an exemplary embodiment may include a compound of graphite and silicon as the anode. Further, the lithium secondary battery according to an exemplary embodiment may include a binder in which a water-based binder such as carboxymethyl cellulose (CMC)/styrene-butadiene rubber (SBR) used in a graphite-based anode is mixed with a polymer binder such as heparin, Dopamine-polymerized heparin and LiPAA for increasing the adhesion strength of a silicon-based anode and suppressing the volume expansion of the silicon-based anode, in order to improve the adhesion of the anode including the compound of graphite and silicon.

The lithium secondary battery according to an exemplary embodiment may include silicon having a higher energy density than graphite as a material for the anode, in order to increase the energy density. However, silicon has a problem in that the volume expands during charging or discharging.

Silicon expands to about four times in volume when it is charged up to $Li_{4.4}Si$, which causes secession and cracks of the electrode, which may threaten the stability of the electrode, as well as the lifecycle of the electrode. Therefore, the lithium secondary battery according to an exemplary embodiment includes a compound of graphite and silicon as the anode by including, as a binder, heparin, dopamine-polymerized heparin and LiPAA, together with CMC/SBR, to suppress the volume expansion of silicon.

Heparin includes a plurality of sites allowing hydrogen binding or covalent binding with CMC, which may function as a cross-linker. Also, a functional group $SO_3^-$ has an advantage in that it can help the transfer of lithium ions. Also, since a catechol functional group of dopamine has a strong adhesion force with a silicon material, a physically improved adhesion force may be provided by polymerizing dopamine with heparin. In addition, the Li+ functional group of LiPAA may improve the lithium ion conductivity between silicon and the conductive material.

Hereinafter, a method of manufacturing an electrode of a lithium secondary battery including a method of manufacturing the compound of the silicon, the binder and the conductive material according to an exemplary embodiment is described.

First Embodiment

In the first embodiment, in order to produce a compound of silicon, a binder and a conductive material, silicon oxide and LiPAA dispersed in ethanol are put into a ball mill device, and a mixture of ZrO2 ball and powder which are mixed at a ratio of 20:1 is put into the ball mill device. When the silicon oxide and the binder are put into the ball mill device together with the balls, the ball mill device repeats the process three times which performs the milling for 1 hour at a speed of 500 rpm with a resting time of 30 minutes. When the first milling process repeated three times is completed, carbon black is further added and a second milling process is performed. The second milling process may also be performed in the same manner as the first milling process. When the compound powder of the silicon, the binder and the conductive material obtained after the second milling process is heat-treated in an argon (Ar) atmosphere at 300° C. for one hour, the final powder is obtained.

Second Embodiment

In the second embodiment, a anode is prepared using the final powder synthesized according to the first embodiment. The anode may be prepared so that the ratio of the electrode active material, the conductive material and the binder is 94:3:3, and the electrode active material may be provided such that the ratio of graphite and silicon oxide is 91.5:8.5. When the conductive material includes a vapor-grown carbon fiber, it may contain the vapor-grown carbon fiber and carbon black in a ratio of 1:1. When the conductive material does not include the vapor-grown carbon fiber, it may include only carbon black. The binder may include CMC and SBR in a ratio of 1:1. The electrode active material, the conductive material and the binder provided in the above-mentioned ratio may be dispersed in distilled water and prepared as an electrode slurry. The electrode slurry may be applied to a copper foil which is a current collector. When the current collector is dried after the electrode slurry is applied to the current collector, the anode for a lithium secondary battery may be obtained.

Figure 2:
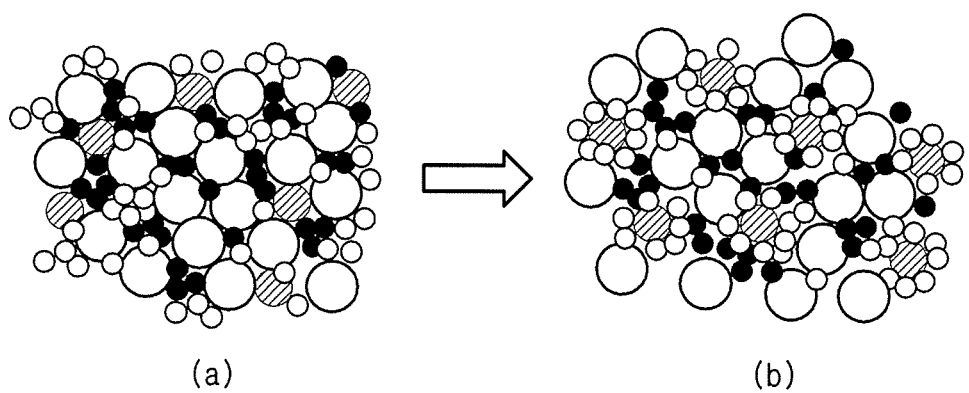
FIG. 2 shows a anode according to an exemplary embodiment of the present disclosure.

FIG. 2 shows a anode according to an exemplary embodiment. FIGS. 2A and 2B conceptually show the change in charging/discharging of a anode according to an exemplary embodiment.

Figure 3A:
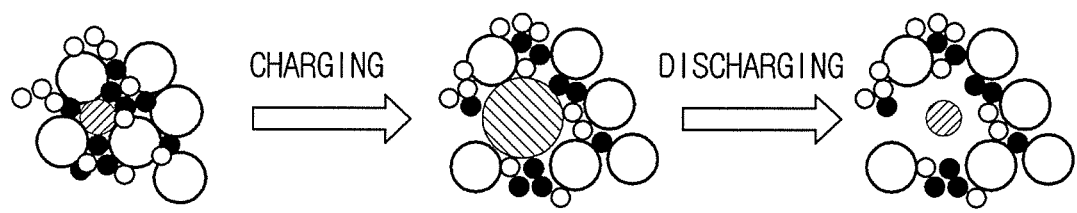
FIGS. 3A and 3B conceptually show a change in the charging/discharging of a anode according to an exemplary embodiment of the present disclosure.

As shown in FIG. 2 and FIG. 3A, a binder of a conventional silicon-graphite composite anode is uniformly distributed. Conventional graphite anode does not have a large volume expansion during charging and discharging, so that there is no problem even if the ratio of a binder and a conductive material is low. However, a silicon-based anode needs to have a high proportion of the binder and the conductive material due to the volume expansion and low conductivity during charging and discharging.

Figure 3B:
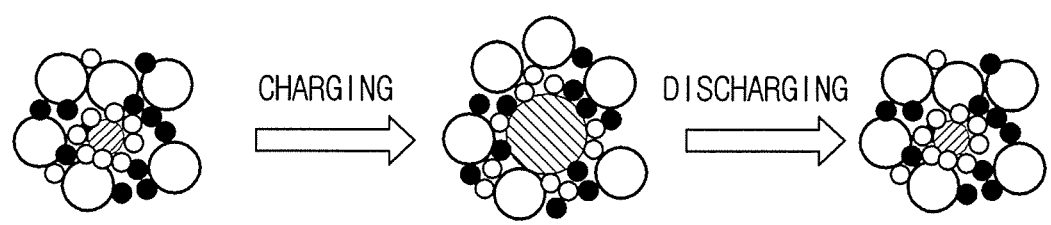

The anode according to an exemplary embodiment concentrates the conductive material and the binder through a ball milling process on a silicon-based material having a large volume change, thereby improving the lifetime of an electrode compared to a conventional anode under the condition of using the same amount of binder. As shown in FIG. 2 and FIG. 3B, the binder is concentrated in the silicon-based material.

Referring to FIG. 3A, there is a problem in that the silicon-based material of the conventional anode may become a dead particle (c) which cannot express capacity due to electron transfer disconnection during charge and discharge processes. However, referring to FIG. 3B, the anode according to an exemplary embodiment solved the above-mentioned problem by concentrating the binder around the silicon-based material.

Figure 4:
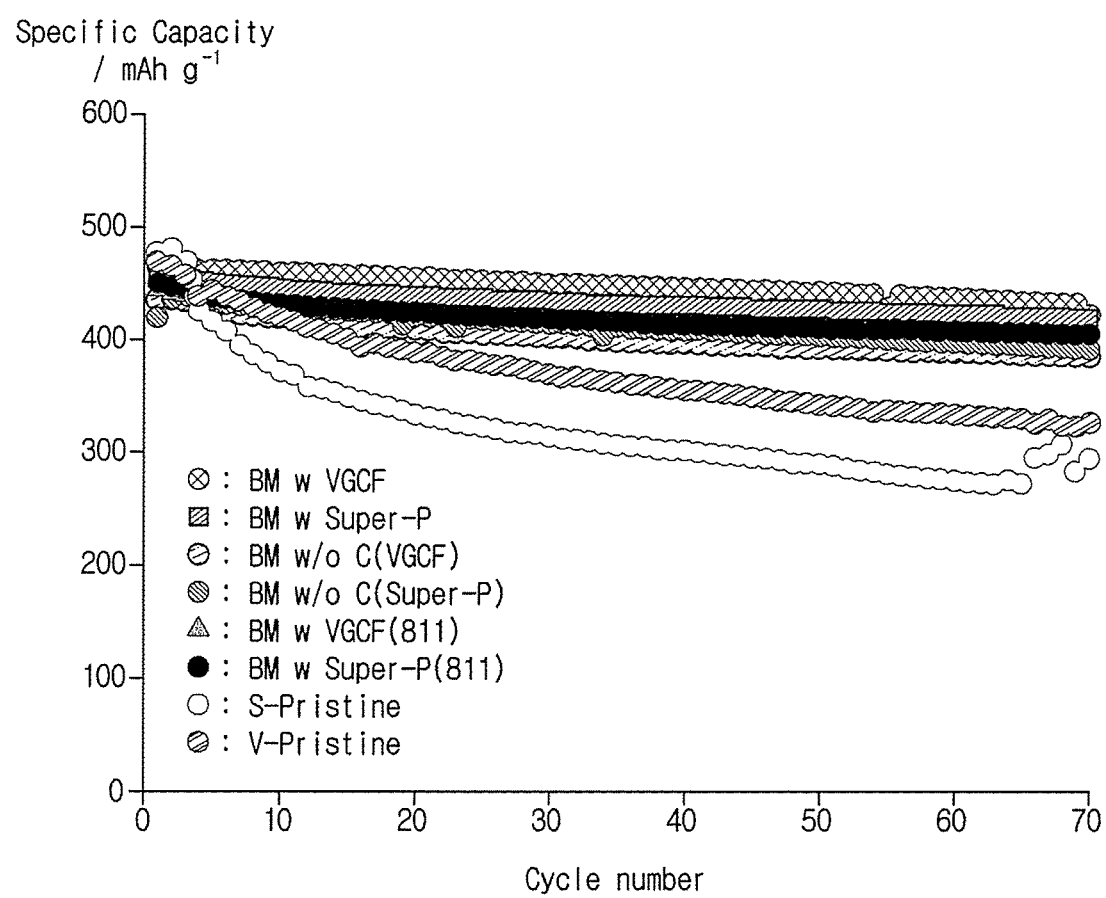
FIG. 4 shows the cycle performance profile of a anode according to an exemplary embodiment of the present disclosure.
Figure 5:
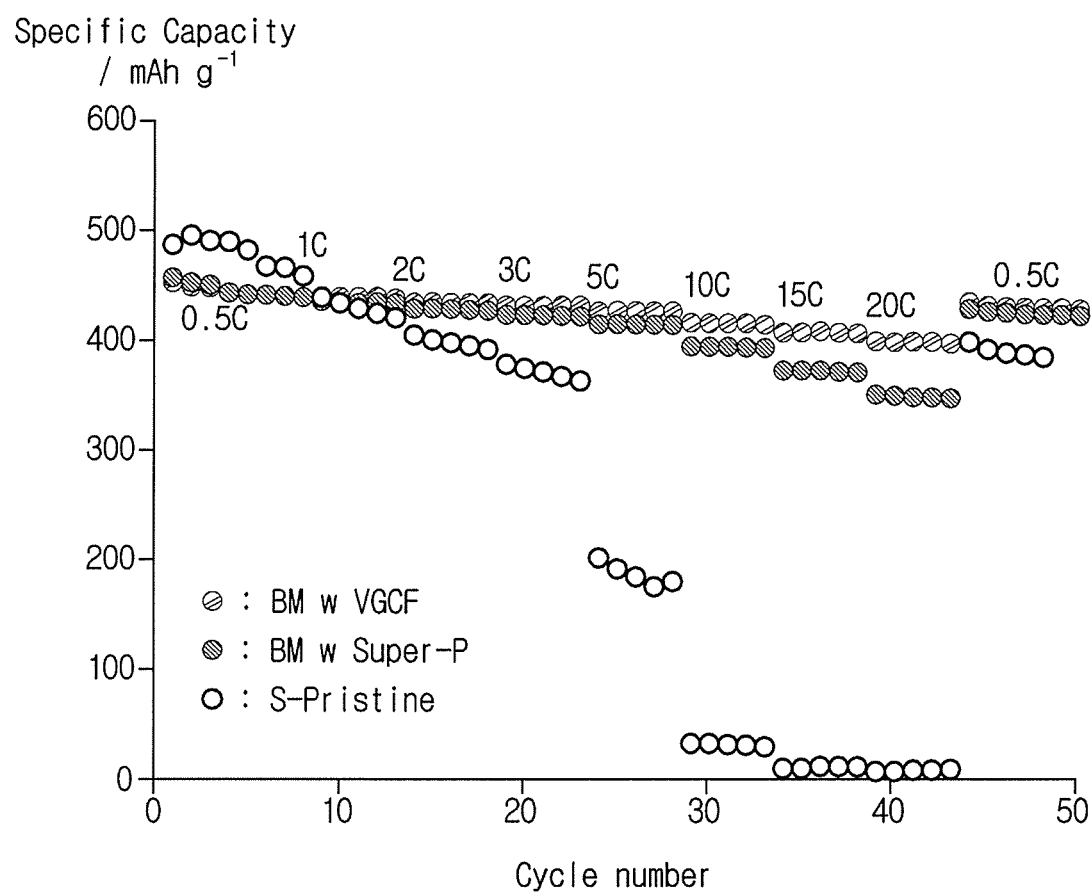
FIG. 5 shows the discharge cycle performance of a anode according to an exemplary embodiment of the present disclosure.

FIG. 4 shows the cycle performance profile of a anode according to an exemplary embodiment. FIG. 5 shows the discharge cycle performance of a anode according to an exemplary embodiment.

As shown in FIG. 4, a anode (BM w VGCF) including a vapor grown carbon fiber as a conductive material among anodes having the ratio according to the second embodiment and a anode (BM w Super-P) including carbon black as a conductive material have more stable performance than anodes manufactured according to other manufacturing conditions.

FIG. 5 shows discharge cycle performances of anodes at discharge C rates ranging from 0.5 C to 20 C. As shown in FIG. 5, a anode (BM w VGCF) including a vapor grown carbon fiber as a conductive material among anodes having the ratio according to the second embodiment and a anode (BM w Super-P) including carbon black as a conductive material have more excellent rate performance and stable performance than anodes manufactured according to other manufacturing conditions.

Therefore, the binder according to the embodiment may be excellent in view of an output characteristic, a life characteristic, and stability of electrode adhesion.

The binder according to the embodiment can suppress the volume expansion of silicon in a complex electrode of graphite and silicon.

The binder according to the embodiment can improve the ion conductivity of lithium ions.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A lithium secondary battery comprising:
an cathode;
a anode;

a separation film disposed between the cathode and the anode; and an electrolyte, wherein the anode comprises an electrode active material comprising a silicon-based material and graphite, a binder, and a conductive material, and wherein the binder comprises dopamine-polymerized heparin.

2. The lithium secondary battery according to claim 1, wherein the silicon-based material has a diameter of 50 nm or more and less than 10 μm.

3. The lithium secondary battery according to claim 1, wherein the anode comprises the binder in an amount of 1 wt % or more and less than 50 wt % based on the total weight of the electrode active material.

4. The lithium secondary battery according to claim 1, wherein the conductive material comprises at least one of carbon black and vapor grown carbon fiber (VGCF).

5. The lithium secondary battery according to claim 1, wherein the anode comprises the conductive material and the binder in a ratio of 1:1 to 1:10.

6. The lithium secondary battery according to claim 1, wherein the binder further comprises any one of heparin and lithium polyacrylate (LiPAA).

* * * * *